Patented Nov. 24, 1970

3,542,513
HEXARUTHENIUM OCTADECACARBONYL AND ITS METHOD OF PREPARATION
Piero Pino, Franco Piacenti and Mario Bianchi, Pisa, Italy, assignor to Lonza Ltd., Gampel, Valais, Switzerland
No Drawing. Filed June 11, 1968, Ser. No. 735,984
Claims priority, application Switzerland, June 16, 1967, 8,610/67
Int. Cl. C01g 55/00
U.S. Cl. 23—203    4 Claims

ABSTRACT OF THE DISCLOSURE

Hexaruthenium octadecacarbonyl ($Ru_6(CO)_{18}$) is prepared by heating trimeric ruthenium tetracarbonyl in a substantially oxygen-free atmosphere at a temperature of 150 to 250° C. and maintaining the carbon monoxide partial pressure during the reaction at 0.2 to 2 atmospheres.

---

This invention relates to a new ruthenium carbonyl compound and to its preparation.

Three different ruthenium carbonyl compounds have been described in the literature: An unstable colorless liquid having the formula $Ru(CO)_5$; a solid compound crystallizing in orange-yellow crystals from benzene and whose composition was found to be $[Ru(CO)_4]_3$; and a green crystallizing compound whose structure has been assumed to be $Ru_2(CO)_9$ but has not yet been confirmed.

We prepare a novel ruthenium carbonyl of the formula $Ru_6(CO)_{18}$ by heating trimeric ruthenium tetracarbonyl $[Ru(CO)_4]_3$ under exclusion of oxygen at temperatures of 150 to 250° C. whereby the partial pressure of the CO during the reaction is maintained at 0.2 to 2 atm. We prefer to use reaction temperatures in the range of 150 to 170° C. and partial CO pressures of 0.2 to 1 atm.

In order to maintain said CO partial pressure, which is produced by the reaction

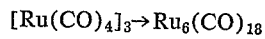
$$[Ru(CO)_4]_3 \rightarrow Ru_6(CO)_{18}$$

during the entire reaction period, it is of advantage to adjust the pressure from time to time by releasing pressure from the reaction vessel.

It is also of advantage to operate in the atmosphere of an inert gas, e.g., nitrogen, helium, or argon.

The reaction can be carried out with or without solvents or diluents. Preferably, solvents are used, e.g., aromatic hydrocarbons such as benzene, toluene, xylene; cycloparaffins such as cyclohexane; and paraffin hydrocarbons. If solvents having a boiling point below 150° C. are used, the reaction is carried out in an autoclave.

The hexaruthenium octadecacarbonyl crystallizes from cyclohexane and toluene in the form of deep red needles. The molecular weight, osmotically determined in dichloroethane as 1050, agrees satisfactorily with the calculated value of 1110.61. $Ru_6(CO)_{18}$ has diamagnetic properties.

The I. R. spectrum of a cyclohexane solution of $Ru_6(CO)_{18}$ in the 2200–1600 cm.$^{-1}$ range shows two strong bands at 2066 and 2047 cm.$^{-1}$ and two very weak bands at 2002 and 1850 cm.$^{-1}$.

The compound $Ru_6(CO)_{18}$ is an excellent catalyst for carbonylation reactions and can be used in a similar manner as other ruthenium carbonyls, e.g., for the preparation of hydroquinone from acetylene and carbon monoxide.

The following examples are given to show the preparation of the catalyst and its use.

EXAMPLE 1

Preparation of $Ru_6(CO)_{18}$ 2 g. of $[Ru(CO)_4]_3$ were placed in a shaking autoclave of stainless steel having a capacity of 125 cm.$^3$. The air was evacuated, and 40 cm.$^3$ of toluene were introduced. Subsequently, $N_2$ was passed into the autoclave to a pressure of 1 atm.

The autoclave was then heated on an oilbath to the temperature of 170° C. and the pressure was maintained at a CO partial pressure of 1.7 to 0.2 atm. by letting the autoclave twice blow off, whereby the first blow-off was allowed after one hour, and the second one after two hours. After 4 hours, the autoclave was cooled, the reaction product was taken out, and cooled to −30° C. The solid product was filtered and yielded 1.6 g. of crude $Ru_6(CO)_{18}$, corresponding to a yield of 92%. After recrystallization from cyclohexane, 1.4 g. of $Ru_6(CO)_{18}$ were obtained in form of deep red needles.

*Analysis.*—Calcd. (percent): C, 19.47; Ru, 54.60. Found (percent): C, 19.81; Ru, 54.60.

EXAMPLE 2

Use of $Ru_6(CO)_{18}$ as carbonylation catalyst in the preparation of hydroquinone A closed glass tube, containing 0.092 g. of $Ru_6(CO)_{18}$, and a ball of stainless steel were placed into a stainless steel autoclave of 485 cm.$^3$ capacity. After removal of the air, 151 g. of tetrahydrofuran, 6.8 g. of water, and 0.186 mole of acetylene were introduced into the autoclave. Subsequently, carbon monoxide was forced into the autoclave to a pressure of 131 atm. and the autoclave was heated to 230° C., with shaking. The pressure reached a value of 298 atm. Then the autoclave was turned upside down whereby the glass tube containing the catalyst was broken. The gas adsorption stopped after 85 minutes (decline of the presure) and the autoclave was cooled, and the pressure released. The escaping gas was analyzed; no acetylene was found.

The liquid reaction mixture was discharged from the autoclave and distilled at normal pressure. The distillation residue of 12.15 g. was extracted for 12 hours with hot water at about 100° C. in a Kumagawa extraction apparatus. Then the water was removed at reduced pressure (20 mm. Hg), and the obtained hydroquinone was sublimed at 1.5 to 2 mm. Hg.

There were obtained 5.96 g. of hydroquinone (M.P. 170–172° C.), corresponding to a yield of 58.3 percent, calculated on reacted acetylene.

We claim:
1. Hexaruthenium octadecacarbonyl.
2. A process of preparing hexaruthenium octadecacarbonyl comprising heating trimeric ruthenium tetracarbonyl $[Ru(CO)_4]_3$ in a substantially oxygen-free atmosphere at a temperature of 150 to 250° C. and maintaining the CO partial pressure during the reaction at 0.2 to 2 atmospheres.
3. The process as claimed in claim 1 wherein the reaction is carried out in an inert gas.
4. The process as claimed in claim 2 wherein the reaction is carried out in the presence of a solvent.

References Cited

UNITED STATES PATENTS 3,387,932   6/1968   Pino et al. _____ 23—203
3,446,591   5/1969   Pino et al. _____ 23—203

E. C. THOMAS, Primary Examiner

U.S. Cl. X.R.
260—621